US007805477B2

(12) United States Patent
Oh et al.

(10) Patent No.: US 7,805,477 B2

(45) Date of Patent: Sep. 28, 2010

(54) COMPUTING CIRCUITS AND METHOD FOR RUNNING AN MPEG-2 AAC OR MPEG-4 AAC AUDIO DECODING ALGORITHM ON PROGRAMMABLE PROCESSORS

(75) Inventors: Jong Hoon Oh, Seoul (KR); Myung Hoon Sunwoo, Suwon-si (KR); Jong Ha Moon, Suwon-si (KR)

(73) Assignees: Pulsus Technologies, Seoul (KR); Ajou University Industry-Academic Cooperation Foundation, Suwon-Si, Gyeonggi-Do (KR)

( * ) Notice: Subject to any disclaimer, the term of this patent is extended or adjusted under 35 U.S.C. 154(b) by 1184 days.

(21) Appl. No.: 11/342,765

(22) Filed: Jan. 30, 2006

(65) Prior Publication Data

US 2007/0027695 A1 Feb. 1, 2007

(30) Foreign Application Priority Data

Aug. 1, 2005 (KR) ..................... 10-2005-0070370

(51) Int. Cl.
*G06F 17/14* (2006.01)

(52) U.S. Cl. ..................................................... 708/402

(58) Field of Classification Search .................. 708/402
See application file for complete search history.

(56) References Cited

U.S. PATENT DOCUMENTS

| | | | | |
|---|---|---|---|---|
| 6,112,171 | A * | 8/2000 | Sugiyama et al. | 704/229 |
| 6,721,708 | B1 * | 4/2004 | Wang | 704/500 |
| 7,043,440 | B2 * | 5/2006 | Shioda et al. | 704/500 |
| 2002/0147752 | A1 * | 10/2002 | Todoroki et al. | 708/402 |

* cited by examiner

*Primary Examiner*—Chuong D Ngo
(74) *Attorney, Agent, or Firm*—Volpe and Koenig, P.C.

(57) ABSTRACT

The present invention relates to computing circuits and method for running an MPEG-2 AAC or MPEG-4 AAC algorithm efficiently, which is used as an audio compression algorithm in multi-channel high-quality audio systems, on programmable processors. In accordance with the present invention, the IMDCT process which takes large part of the amount of the operations in implementation of an MPEG-2/4 AAC algorithm can be performed in efficient. In addition, while the architecture of the existing digital signal processor is still used, the performance can be improved by means of the addition of the architecture of the address generator, Huffman decoder, and bit processing architecture. After all, to design and change the programmable processor is facilitated.

6 Claims, 9 Drawing Sheets

COMPUTING CIRCUITS AND METHOD FOR RUNNING AN MPEG-2 AAC OR MPEG-4 AAC AUDIO DECODING ALGORITHM ON PROGRAMMABLE PROCESSORS

FIELD OF THE INVENTION

The present invention relates to computing circuits and method for running decoding operations efficiently in an MPEG-2 AAC or MPEG-4 AAC algorithm, which is used as an audio compression algorithm in multi-channel high-quality audio systems, on programmable processors such as Digital Signal Processors, microprocessors, and so on.

BACKGROUND OF THE INVENTION

As the demand for multi-channel high-quality audio has been increased recently, the interest in digital multi-channel audio compression algorithm has been also increased. In order to research compression technologies for digital audio and video, ISO/IEC (International Standards Organization/International Electrotechnical Commission) founded ISO/MPEG (Moving Pictures Expert Group) in 1988. In 1994, ISO/MPEG started a standardization work for a new compression method available in application fields, in which compatibility with MPEG-1 stereo format was dispensable, and in the process of the work, the standard was designated MPEG-2 NBC (Non-Backward Compatible). Before starting the standardization work, ISO/MPEG had taken a comparative tests of MPEG-2 BC (Backward Compatible) compatible with MPEG-1, with Dolby's AC-3 and AT&T's MPAC, then they reached the conclusion that removing the backward compatibility resulted improvements in the performance of the coder. The goal of MPEG-2 NBC was that the quality of 5-channel full-bandwidth audio signals with a bit rate under 384 kbit/s reached the "aurally indistinguishable" level defined by ITU/R (International Telecommunication Union, Radiocommunication Bureau). Thereafter, MPEG-2 NBC was announced as a new international standard for multi-channel audio coding method in April 1997, and at that time the name was changed to MPEG-2 AAC (Advanced Audio Coding, ISO/IEC 138187). MPEG-2 AAC has been standardized through the above-mentioned process, and is an audio coding method which encodes 5-channel audio signals into high-quality audio data with the bit rate of 320 kbps (64 kbps per one channel).

FIG. 1 is a block diagram that shows an MPEG-2 AAC audio decoding algorithm in the prior art. With reference to FIG. 1, in the MPEG-2 AAC audio algorithm, high-resolution filter bank; prediction coding; sound pressure stereo coding; TNS (Temporal Noise Shaping); and Huffman coding are combined in order to provide an "aurally indistinguishable" sound quality from that of the original sound, with the bit rate under 384 kbit/s. This MPEG-2 AAC audio compression algorithm is a kind of transform coding method using MDCT (Modified Discrete Cosine Transform), and a bit allocation method based on a psychological sound model is used in order to compress the transformed signal.

Further, considering the trade-off among the sound quality, the memory usage, and the power demand, the MPEG-2 AAC audio system supports three types of profile, i.e., the main profile, the LC (Low Complexity) profile, and the SSR (Scalable Sampling Rate) profile are supported.

First, the main profile provides the best sound quality with a given bit rate, and all the tools of AAC are used only except the gain control tool. The main profile is capable of decoding the bit stream of LC profile which may be mentioned later.

Second, the LC profile is the most frequently used profile in general, both the prediction tool and the gain control tool are not used, further the degree of the TNS is limited. The LC profile is characterized by its lower memory usage and power demand than those of the main profile, though its sound quality is relatively acceptable.

And last, the SSR profile consists of the LC profile and the gain control tool. But the prediction tool is not used, moreover the bandwidth as well as the degree of the TNS is limited. The advantage of the SSR profile is that it provides variable frequency signal even though it has lower complexity than that of the main profile or the LC profile.

The most essential part of the high-quality audio compression encoding and decoding system is transforming a time domain signal into an internal time-frequency expression or running the inverse transformation. In MPEG-2 or MPEG-4 AAC, the transforming process above is executed by MDCT and IMDCT (Inverse MDCT), to which so-called TDAC (Time Domain Aliasing Cancellation) method is applied.

The above-mentioned transform coding process makes up approximately 48 percent of the total operations of the LC profile, as is shown in FIG. 2. IMDCT used in AAC audio decoder equals the following Formula 1.

Formula 1

$$x(i) = \sum_{k-0}^{\frac{N}{2}\cdot 1} X(k)\cos\left[\frac{\pi}{2N}\left(2i + 1 + \frac{N}{2}\right)(2k+1)\right], \text{ for } 0 \le i \le N-1$$

Herein, N, I, and k indicate the number of the operation points of IMDCT, the sample index in time domain, and the sample index in frequency domain, respectively. As is shown in Formula 1, X(k)cos(·) should be accumulated N/2 times so that an x(i) sample which is a result of IMDCT can be obtained. Implementing IMDCT by its definition shown in Formula 1 with the purpose of running the transform coding process above is called a direct implementation of IMDCT. In addition, the number of the operation points of IMDCT in AAC is 2048 in case of a long block and 256 in case of a short block, respectively.

Although the direct implementation by Formula 1 can be used for IMDCT operations, high-speed IMDCT algorithm, using N/4 points IFFT (Inverse Fast Fourier Transform) which is the simplest in respect of hardware implementation and has small amount of operations in respect of IMDCT operations of $2^N$ points as an IMDCT implementation algorithm, is commonly used. This high-speed IMDCT algorithm consists of two steps by the following Formula 2 and Formula 3.

Formula 2

$$y(n) = \left[\sum_{k-0}^{\frac{N}{4}-1} \left\{\left(X\left(\frac{N}{2} - 2k - 1\right) + j\cdot X(2k)\right)e^{j\frac{2\pi}{N}\left(k+\frac{1}{8}\right)}\right\}e^{j\frac{2\pi}{N/A}a}\right]e^{j\frac{2\pi}{N}\left(n+\frac{1}{8}\right)}$$

Formula 3

$$x(2n) = -y_i\left(\frac{N}{8} + n\right),\ x(2n+1) = y_r\left(\frac{N}{8} - n - 1\right)$$

$$x\left(\frac{N}{4} + 2n\right) = -y_r(n),\ x\left(\frac{N}{4} + 2n + 1\right) = y_i\left(\frac{N}{4} - n - 1\right)$$

-continued $$x\left(\frac{N}{2}+2n\right)=-y_r\left(\frac{N}{8}+n\right),\ x\left(\frac{N}{2}+2n+1\right)=y_i\left(\frac{N}{8}-n-1\right)$$

$$x\left(\frac{3N}{4}+2n\right)=y_r(n),\ x\left(\frac{3N}{4}+2n+1\right)=-y_r\left(\frac{N}{4}-n-1\right)$$

$$\text{for, } 0\le n<\frac{N}{8}$$

In Formula 2, $$\sum_{k=0}^{\frac{N}{4}-1}\{g\}e^{j\frac{2\pi}{N/4}rk}$$

is N/4 points IFFT operation. Furthermore $$(g)e^{j\frac{2\pi}{N}\left(k+\frac{1}{8}\right)} \text{ and } (g)e^{j\frac{2\pi}{N}\left(n+\frac{1}{8}\right)}$$

represents the pre-processing and the post-processing of IFFT operation, respectively. Formula 3 is a de-interleaving process, herein $y_r$ and $y_i$ means real {y(n)} and image {y(n)} respectively.

On the whole, most of the general purpose DSP uses high-speed IMDCT algorithm using N/4 points IFFT in order to handle $2^N$ points IMDCT with small amount of operations.

Referring to FIG. 3 which is a block diagram to show every step of IMDCT operation process in AAC, a complex number, X(N/2−2k−1)+jX(2k) is built out of a frequency domain input signal X(k) by using X(N/2−2k−1) and X(2k), so that the pre-processing of high-speed IMDCT can be handled. That is, for the pre-processing, the input signal X(k) made up with a real number is changed into X(N/2−2k−1)+jX(2k), which is a complex number, through a specific address generating method.

General purpose DSP chips do not support a specific instruction and hardware architecture by which X(k) written in the memory can be directly expressed as the complex number X(N/2−2k−1)+jX(2k). Accordingly, data transfer cycles, which mean sets of instructions transferring the real number data X(k) written in the memory for handling the pre-processing of high-speed IMDCT operation to the specific address form, take large part of the total operations.

As is shown in Formula 2, in case that IMDCT with 256 points is accomplished by high-speed algorithm, X(N/2−2k−1)+jX(2k), which is a complex number built out of an input signal sample, is multiplied by $$e^{j\frac{2\pi}{N}\left(k+\frac{1}{8}\right)}$$

during the pre-processing in accordance with the IMDCT algorithm shown in FIG. 3. Herein, N is 256 as the number of the points of IMDCT, and k is an integer from 0 to 63 as the input index. The parameters of the formula above can be changed, because the number of the points of IMDCT used in MPEG-2 or MPEG-4 AAC audio compression algorithm is 2048 in case of a long block and 256 in case of a short block respectively.

X(k) data written in the DSP chip should be transferred to a data processing device of a core in the order of k, so that the input sample can be transformed into a complex number during the pre-processing of 256 points IMDCT, such as X(127)+jX(0) when k=0; X(125)+jX(2) when k=1; X(123)+jX(4) when k=2; and so on, then the complex number operation is accomplished. However, two address registers may be allocated in order to transfer the input sample when a general purpose DSP chip is used. For each register, post 2 decrement addressing mode is used for one and post 2 increment addressing mode is used for the other, in the process of transferring each data to the next cycle. That is, in order to make audio data except ROM data for one butterfly operation, time for at least two cycles should be consumed with two address registers. For almost all of commercial DSP chips support post decrement and increment addressing mode, address generating can be performed more efficiently. Though, there is a disadvantage that two data necessary for complex number generating cannot be transferred simultaneously.

At present, as commercial DSP chips for multi-channel high-quality audio processing, there are SHARC DSP's ASDSP-21065L; Cirrus Logic's CS49300 and CS49500; TI's (Texas Instrument) TMSc55x, TMSc64x, and TMSc67x series; LSI Logic's ZSP40x; CLARKSPUR's CD2450 and CD2480; Philips TriMedia's TM-1300 and PNX1500; and Tensilica's Xtensa. Further, ARM's ARM9M and ARM9E are also capable of AAC processing. Most of these commercial DSP chips or processors support the LC profile for multi-channel or stereo channel, moreover TI's TMSc67x, LSI Logic's ZSP series, and SHARC DSP's ASDSP-21065L can support the main profile of AAC.

In general, commercial DSP chips for audio processing assign 24 or 32 bits for data expressions, and they are designed to hold sufficient memory space or to facilitate the I/O with external audio signals so that multi-channel audio processing can be accomplished. Further, in almost every DSP for multi-channel audio system, many hardware resources are run in parallel so as to handle the audio data more than 5.1 channels in real time. For example, SHARC DSP's ASDSP-21065L processor has a Super-Harvard architecture which is capable of running both SIMD (Single Instruction Multiple Data) and SISD (Single Instruction Single Data), then many hardware resources can be run in parallel. In addition, TMS320c64x, TMS320c67x, TM-1300, and PNX1500 are VLIW (Very Long Instruction Word) processors, and they run quite many hardware resources in parallel by program control using a compiler which is software. In other words, the DSP operation core has Super-Harvard or VLIW architecture in most of the audio only DSP released by commercial DSP chip developing companies, further in many cases, DSP essentially has many ALUs (Arithmetic and Logic Unit) and other hardware resources so that various audio algorithms can be run at high speed. Moreover, in comparison with DSP core, peripheral devices are used more exclusively by audio I/O operations, so in many cases, there exist exclusive instructions not for audio signal processing operations but for control of the peripheral devices related to I/O of the audio signals.

However, most of these commercial DSP cores had disadvantages that, their size and the amount of power consumed were relatively large due to their architectural characteristics, and as a result, the efficiency of implementation was lowered when the chips were implemented with SOC (System on a Chip).

SUMMARY OF THE INVENTION

Accordingly, the present invention has been made to solve the above-mentioned problems occurring in the prior art, and an object of the present invention is to provide computing circuits and method for running an MPEG-2 ACC or MPEG-4 ACC algorithm on programmable processors in multi-channel high-quality audio systems, which is appropriate to process high-quality audio signals at high-speed and performs audio decoding operations efficiently with a small chip size and small amount of power consumed.

In order to implement this, computing circuits for running an MPEG-2 or MPEG-4 ACC audio decoding algorithm on programmable processors in accordance with the present invention comprises: a program control device which generates an operation starting signal of the MPEG-2 or MPEG-4 AAC algorithm and controls the programmable processor; a program memory storing application programs of the programmable processor; an inverse address calculating unit for generating inverse addresses of the input data in MDCT or IMDCT operations of the MPEG-2 or MPEG-4 AAC algorithm; a data memory storing data for operations; an address generator for calculating the addresses of the data memory by use of inverse addresses generated by the inverse address calculating unit; a data ROM storing cosine and sin data; a data processing device which performs arithmetic and logic operations using the data memory and Rom data above; and a state register for running the MPEG-2 or MPEG-4 decoding operations.

In addition, a method for running an MPEG-2/4 AAC algorithm on programmable processors efficiently in accordance with the present invention comprises the steps of: authorizing operation signals for the pre-processing of IMDCT operation used by the filter bank based on the amount of operations of the MPEG-2/4 AAC algorithm; generating two addresses in one address register by a specific address generating rule; reading the data from the data memory and ROM memory; and running the butterfly operations necessary for the pre-processing in parallel.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, a preferred embodiment of the present invention will be described with reference to the accompanying drawings.

Figure 4:
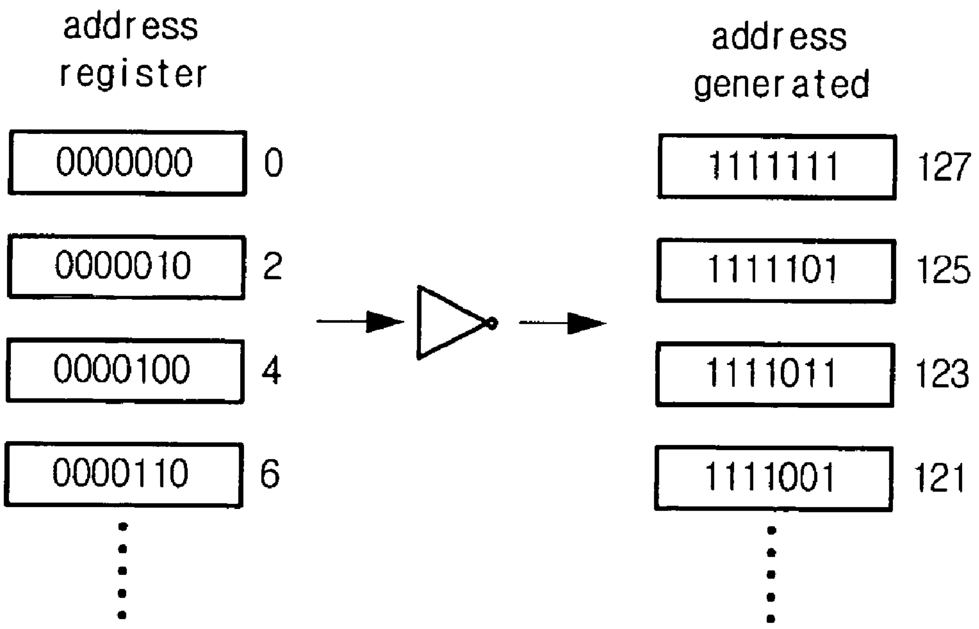
FIG. 4 presents a diagram for explaining the architecture of the programmable processor in accordance with the present invention.

FIG. 4 presents a diagram for explaining the architecture of the programmable processor in accordance with the present invention. As is shown in FIG. 4, by use of a new inverse addressing mode, a complex number sample necessary to the pre-processing of high-speed IMDCT operation in a memory can be transferred to a general register in one cycle, only with one data address register, ROM table address register, and a simple bit operation circuit which inversely transforms each bit concerned. That is very efficient.

Figure 1:
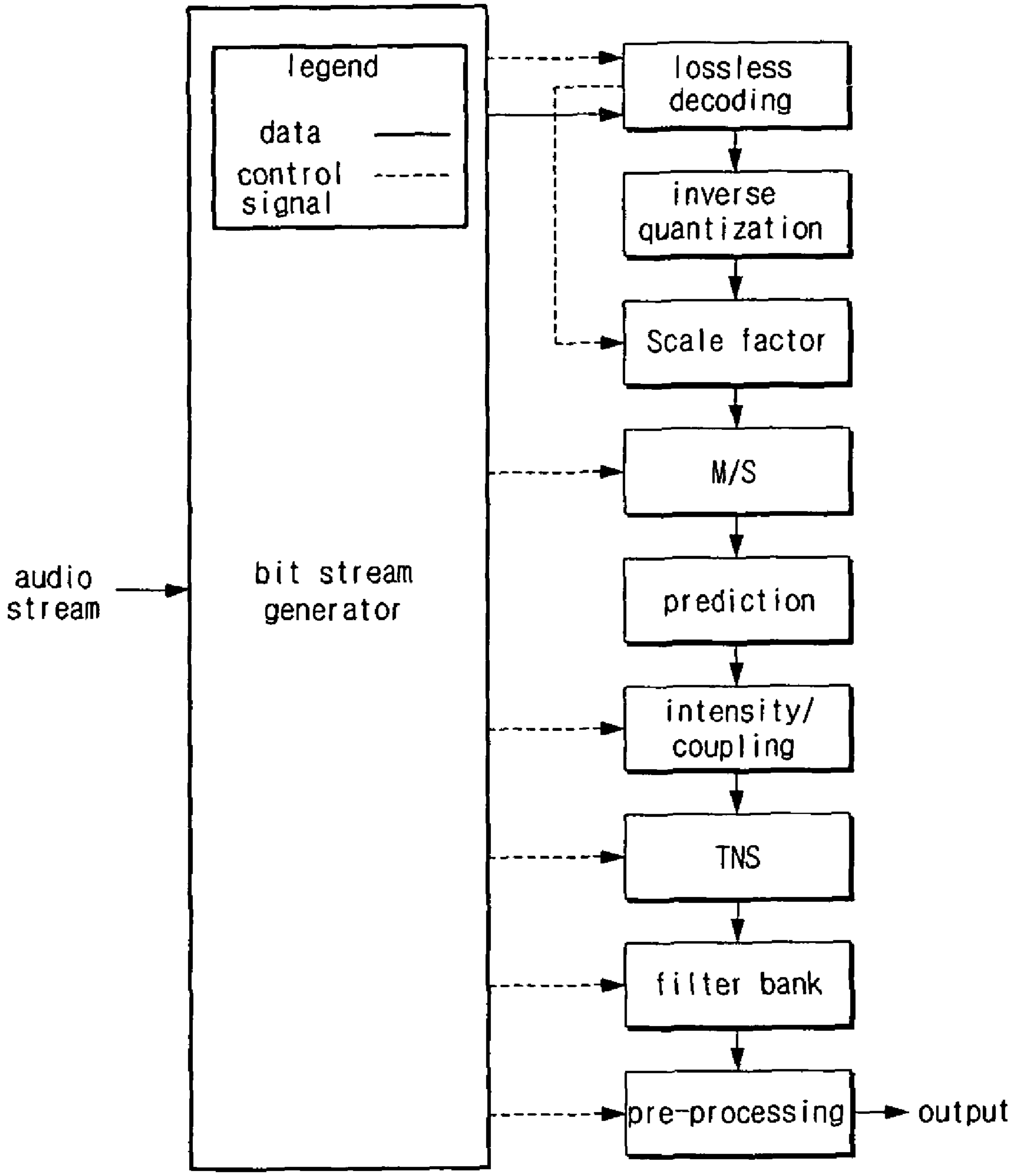
FIG. 1 is a block diagram showing the process of the MPEG-2 AAC audio decoding algorithm in the prior art.
Figure 2:
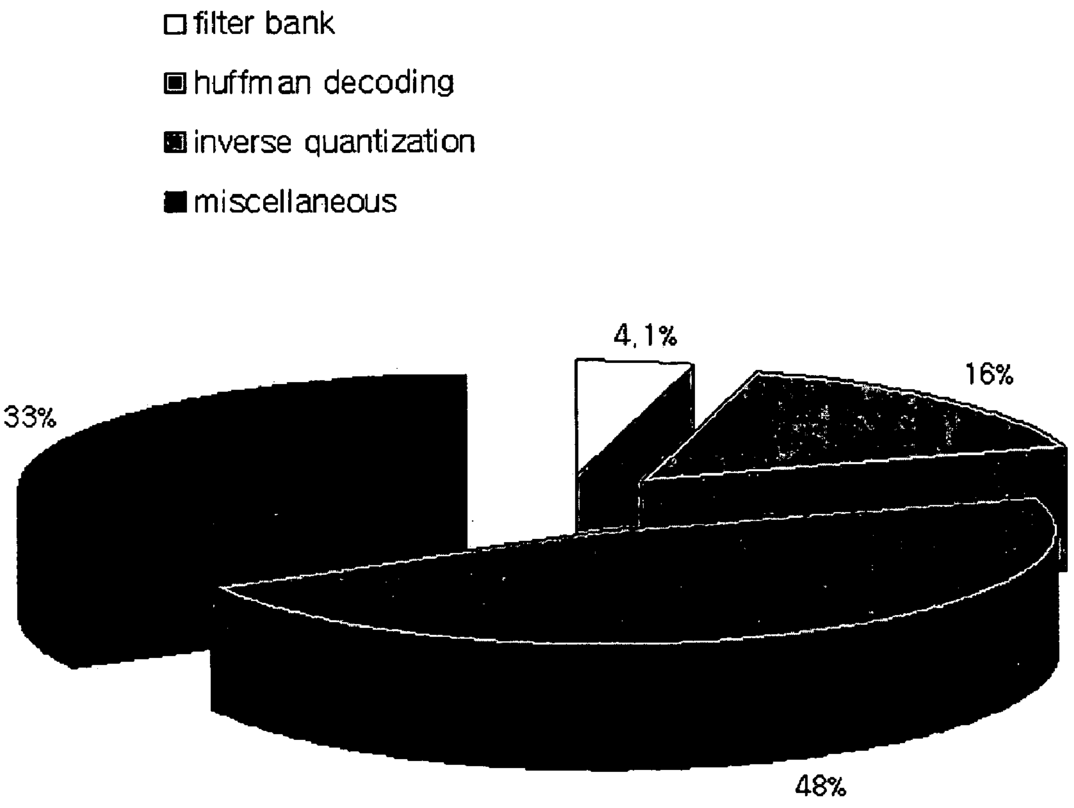
FIG. 2 provides a graph showing the amount of operations of MPEG-2 AAC LC profile designated by ISO/IEC.
Figure 3:
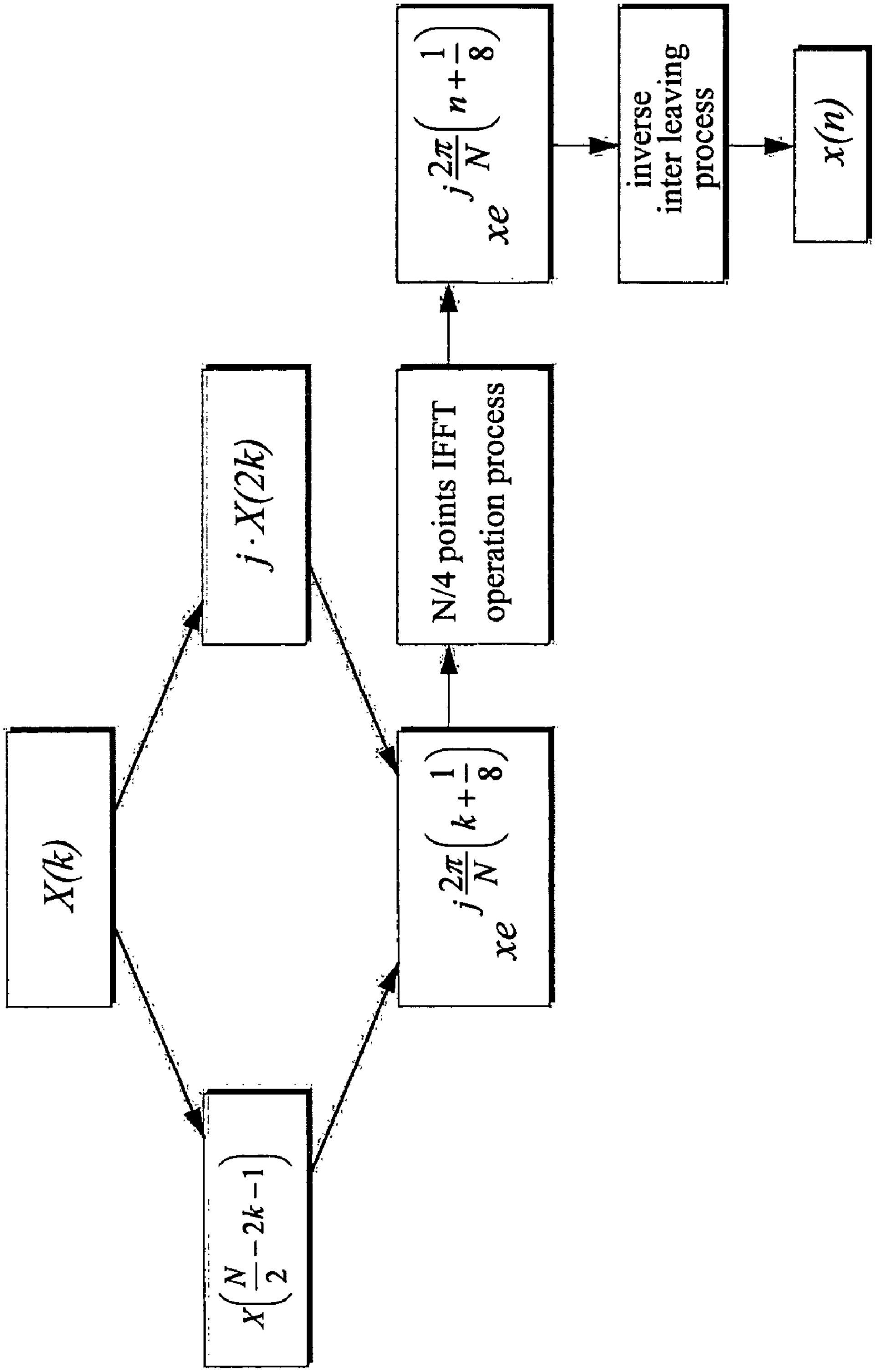
FIG. 3 is a block diagram showing the common IMDCT operation process by steps.

In the next process, after the N/4 points IFFT in high-speed IMDCT algorithm and the post-processing, a final x(n) sample is output through the inverse interleaving process of data shown in FIG. 3. The total number of the samples output before the data inverse interleaving process during the N points high-speed IMDCT process is N. Though, the number of the final output samples in IMDCT operation doubles that of the input samples, so N data are reorganized as 2N data through the data inverse interleaving process. For example, in case of 256 points high-speed IMDCT operation, the total number of data generated through the pre-processing, the N/4 points IFFT, and the post-processing is 256. In the data inverse interleaving process after the post-processing, 256 data generated in the post-processing are read from the memory and the 512 samples are generated finally according to the formula 3 which is the definition of the inverse interleaving in high-speed IMDCT algorithm. That is, after one data is read from the memory and processed according to the formula 3, the processed data is written twice in a specific memory addresses. Thus, the data inverse interleaving process is a process in which the sample values stored in the memory is reorganized by a specific rule. In the above process, operators in DSP chip are rarely used, but memory-read and memory-write for the data take most part of the process. In case of commercial DSPs, the memory-read/write instructions are used repeatedly in order to accomplish the data inverse interleaving process of high-speed IMDCT algorithm.

Figure 5:
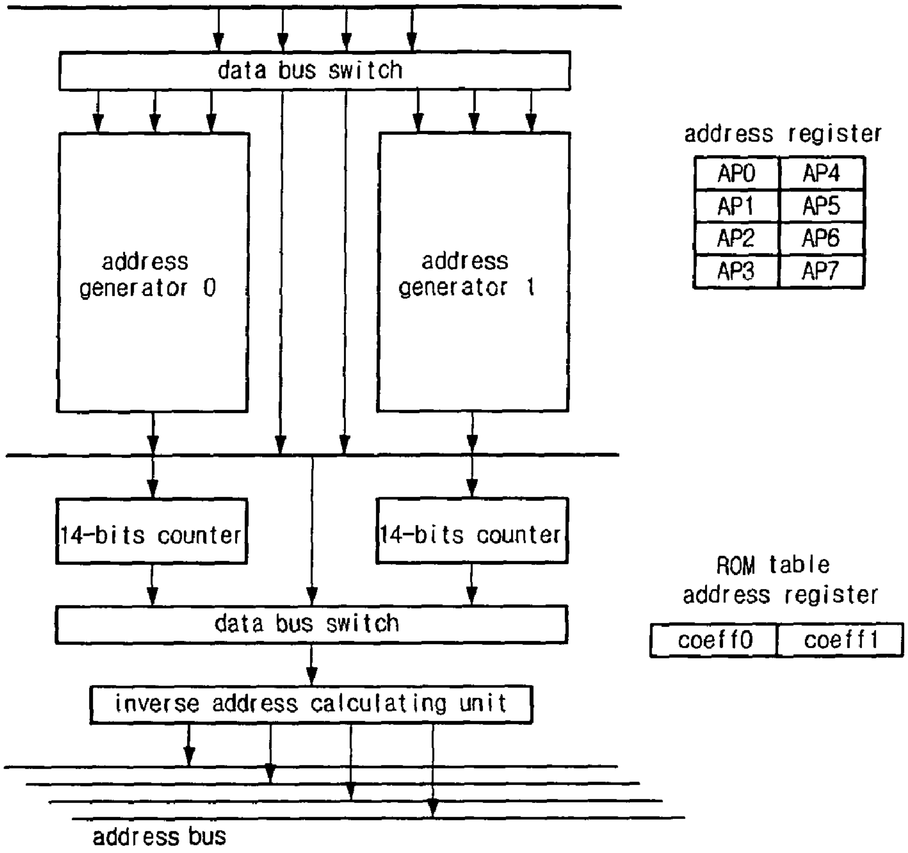
FIG. 5 presents a diagram for explaining the inverse address generating process in accordance with the present invention.

FIG. 5 presents a diagram for explaining the inverse address generating process in accordance with the present invention, and architecture of an improved address generator by which large number of data can be transferred efficiently at the same time during the memory read and write process is shown. Applying this new architecture, although the additional hardware resources are minimized, efficient operation of MPEG-2/4 AAC algorithm can be implemented. The improved architecture can run 4 memory-reads or 2 memory-writes in parallel with general operation instructions with a few hardware resources. The additional hardware resources necessary to the new architecture are two 14-bits counters for the address generation of the ROM table. The added 14-bits counters are optimized for the size of the ROM table and have very small hardware size. By use of the improved architecture, the memory bandwidth can be ensured efficiently in the inverse interleaving process of high-speed IMDCT algorithm and in application programs for which high-speed data transfer is needed.

Figure 6:
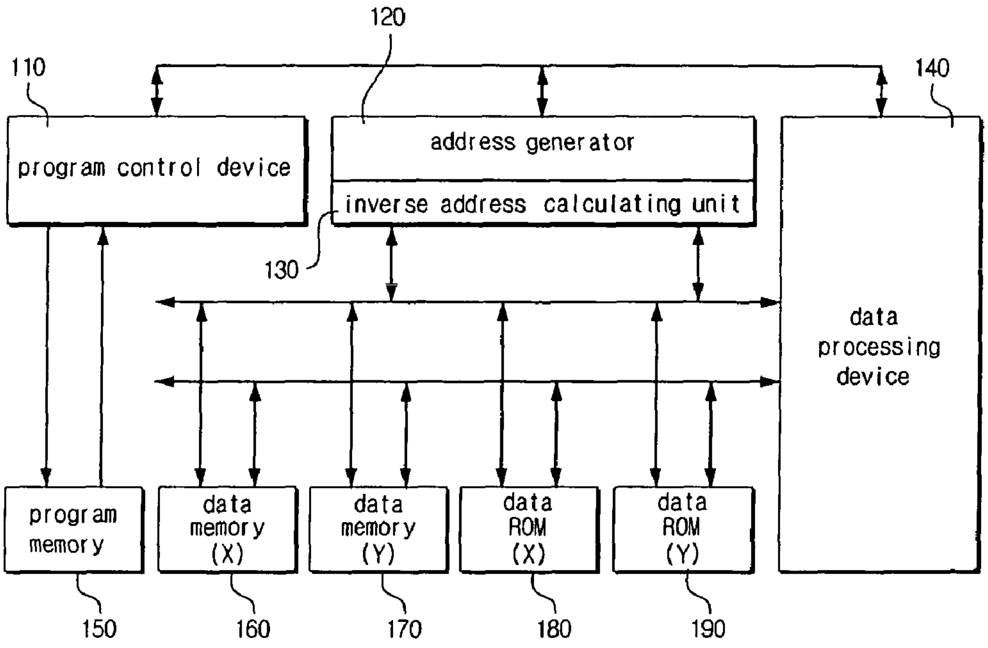
FIG. 6 is a diagram for explaining the architecture of the address generator in accordance with the present invention.

FIG. 6 is a diagram for explaining the architecture of the address generator in accordance with the present invention. Computing circuits for running an MPEG-2/4 ACC audio decoding algorithm on programmable processors according to the present invention comprises: a program control device (110) which generates an operation starting signal of the MPEG-2/4 AAC algorithm and controls the programmable processor; a program memory (150) storing application programs of the programmable processor; an inverse address calculating unit (130) to support the inverse address generating mode of the input data in MDCT or IMDCT operations of the MPEG-2/4 AAC algorithm; an address generator (120) for calculating the addresses of the data memory (160,170) by use of inverse addresses generated by the inverse address calculating unit (130); an data memory (160,170) storing data; a data ROM (180,190) storing cosine and sin data; and a data processing device (140) which performs arithmetic and logic operations using the data in the data memory (160,170) and the data Rom (180,190). Herein, the data processing device (140) above comprises: 2 multiplication accumulators which accumulate the result of data multiplication; 1 ALU; an input register storing a value of data memory; and an accumulator for storing a result of operation and using the result in operation again.

Instructions in accordance with the present invention are, LDPRE (Load for Pre-processing) by which the operation data can be read from the data memory by a specific address generating method in the pre-processing while using high-speed IMDCT algorithm, and LD4 (Load 4 sources) by which 4 data can be read from the data memory and the ROM at the same time in the post-processing of IMDCT operation and data inverse interleaving process. By use of the instructions above, the amount of operations of the programmable processor for decoding the MPEG-2/4 AAC algorithm is decreased in comparison with the exiting programmable processors and the operation can be run efficiently, in addition, fewer hardware resources are needed than in commercial DSPs.

The program control device (110) above discharges controlling the program like in the existing programmable processors, in addition, decodes the LDPRE instruction and transfers the MDCT/IMDCT operation point of the state register in the program control unit to the inverse address calculating unit (130), and notifies the start of the inverse addressing mode to the inverse address calculating unit (130) and the address generator (120).

Figure 7:
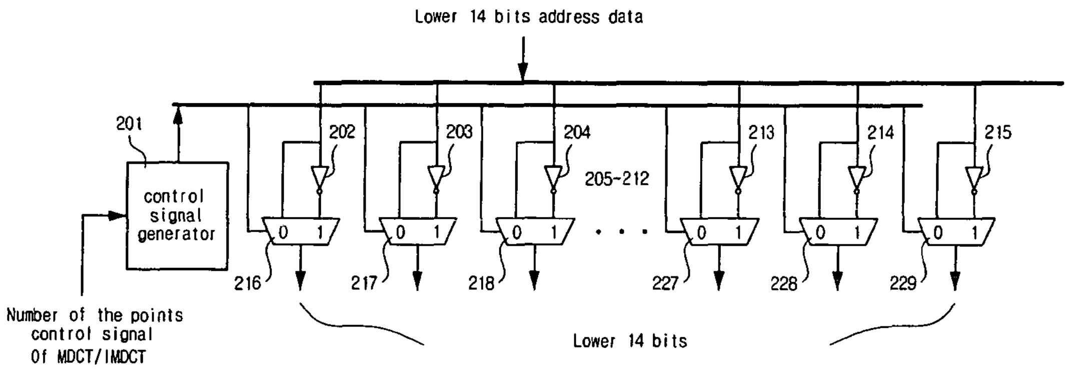
FIG. 7 illustrates a diagram for explaining the architecture of the inverse address calculating unit in accordance with the present invention.

FIG. 7 illustrates a diagram for explaining the architecture of the inverse address calculating unit in accordance with the present invention, and the internal structure of the inverse address calculating unit supporting the LDPRE instruction is shown. The inverse address calculating unit above is used in order to run high-speed MDCT/IMDCT efficiently in the process of filter bank of MPEG-2/4 AAC algorithm. Observing FIG. 7 which is a detailed diagram of the inverse address calculating unit, the inverse address calculating unit (130) comprises: a control signal generator (201) generating a control signal to which the number of points of MDCT or IMDCT operation stored in the state register of the program control unit is input; 14 inverters (202, 203, 204, 205, 206, 207, 208, 209, 210, 211, 212, 213, 214, 215) which inversely transforms the lower 14 bits of the address register; 14 multiplexers (216, 217, 218, 219, 220, 221, 222, 223, 224, 225, 226, 227, 228, 229) for selecting an address; and a connection line.

Figure 8:
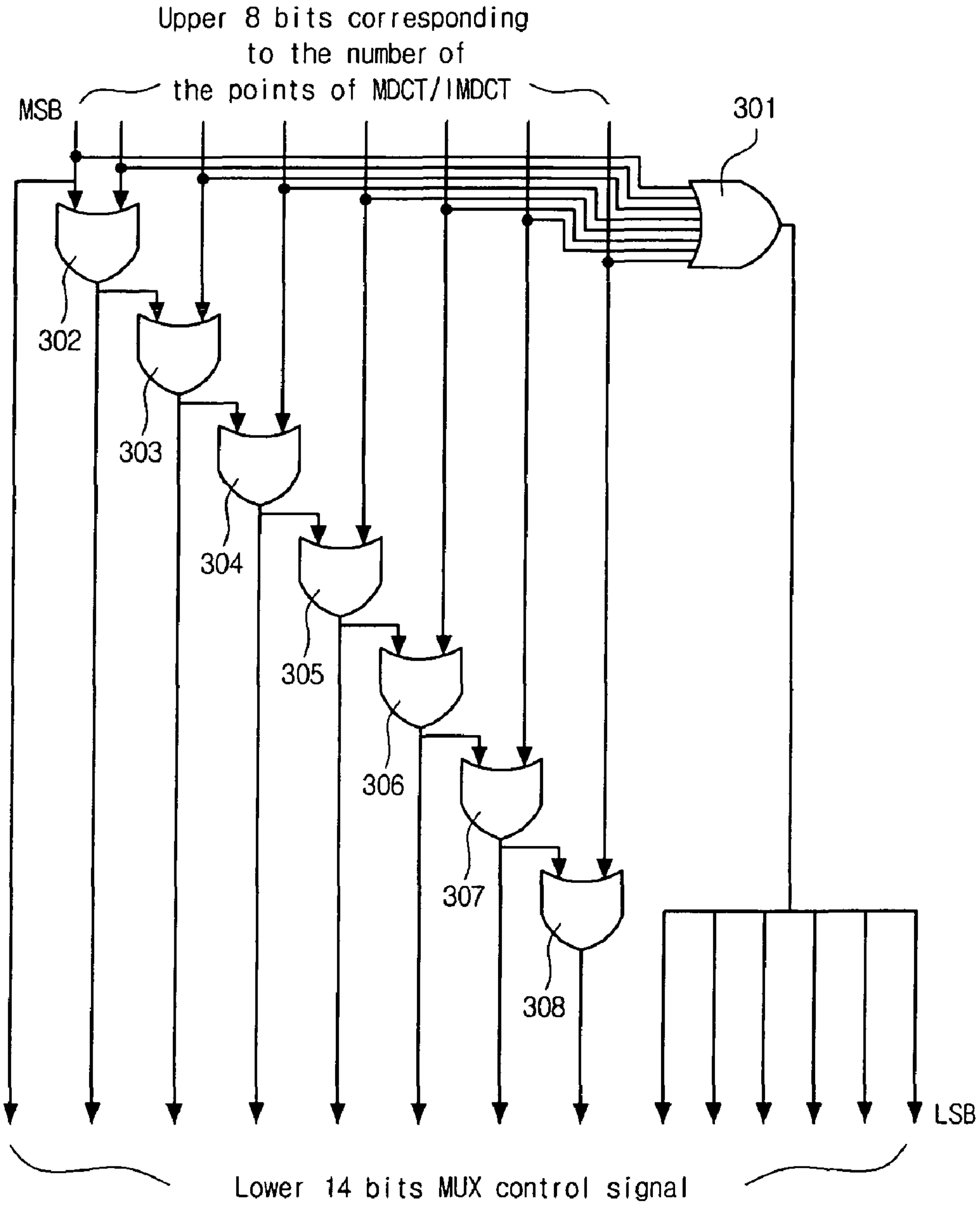
FIG. 8 is a diagram for explaining the architecture of the control signal generator of the inverse address calculating unit in accordance with the present invention.

FIG. 8 is a diagram for explaining the architecture of the control signal generator of the inverse address calculating unit in accordance with the present invention, and the internal control signal generator is shown in detail. The input data shown in FIG. 8 is 8 bits of MSB (Most Significant Bit) of the number of the MDCT/IMDCT points. The output data, control signal is total 14 bits and used as a signal controlling the multiplexer in FIG. 7. The inside of the control signal generator (201) comprises: one 8-input AND gate (301); 7 2-input OR gates (302, 303, 304, 305, 306, 307, 308); and a connection line.

The data address generating method in the inverse address calculating unit above comprises the steps of: transferring only upper 8 bits of the number of the IMDCT/MDCT points stored in the state register to input port of the control signal generator (201) after decoding the LDPRE instruction in the program control device; generating 14 bits of the control signal in control signal generator according to the number of the IMDCT/MDCT points; inputting the control signal onto the multiplexer in the inverse address calculating unit as a selection signal; and outputting 14 bits of the address data through the multiplexer.

The inverse address generated in the inverse address calculating unit above becomes the input of the offset register in the address generator of the programmable processor, with the original address before the inverse address is generated. Then the offset and the basic base address are used together as an address.

In general, commercial programmable processors have to generate two data addresses for pre-processing high-speed IMDCT operation algorithm. One of the offset register should be post-increased by 2 from 0, while the other of the offset register should be post-decreased by 2 from the half of the number of the points. At this time, the existing programmable processors are not efficient in the aspects of the amount of the operations and the power consumed as compared with the architecture of the present invention, because they have to use the ALU or the modulo operating unit in the address generator in order to generate each address.

Figure 9:
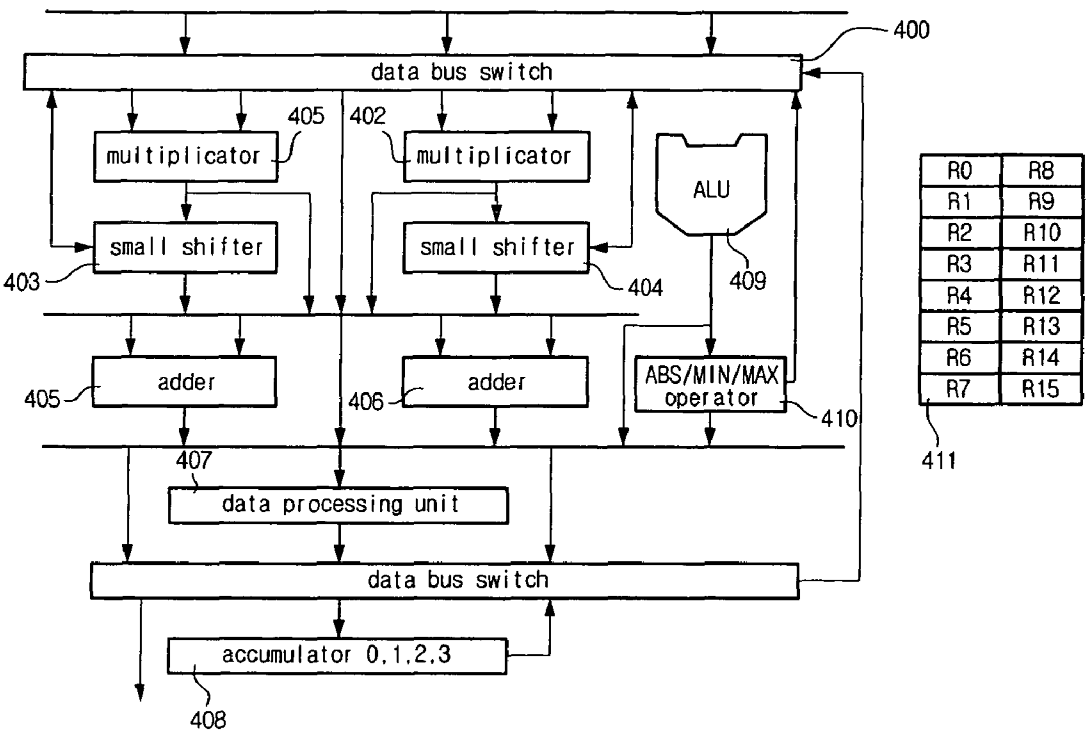
FIG. 9 depicts a diagram for explaining the bit extracting process in ALU in accordance with the present invention.

FIG. 9 depicts a diagram for explaining the bit extracting process in ALU in accordance with the present invention and it shows the data processing device for running decoding operation of an MPEG-2/4 ACC algorithm efficiently. The above-mentioned data processing device (140) comprises: 2 multiplicative accumulators (401, 402, 403, 404, 405, 406) which support small shift operation; 1 ALU (409); an operator (410) which processes the maximum, minimum, and absolute value; a data bus switch (400); 16 input registers (411); a data processing unit (407) for Saturation/Limit/Round; and 4 accumulators (408).

The multiplicative accumulators in accordance with the present invention support a logical network architecture by which the input can be obtained from the bus switch without passing the multiplicators in order to use accumulators.

The data processing device stores the data read from the memory in 16 input registers to use it, and supports the small shifter which supports the shift operation before and after the multiplication and the addition so that the division and the multiplication can be run efficiently in the inverse quantization process. The total number of the data bits can be 24 bits which is efficient in audio algorithm or 32 bits which makes the post-processing such as an equalizer in digital audio high-performance.

In accordance with the present invention, as is mentioned in detail, computing circuits and method for running an MPEG-2/4 AAC algorithm efficiently are provided, and IMDCT process which takes large part of the amount of the operations in implementation of an MPEG-2/4 AAC algorithm can be performed in efficient. In addition, while the architecture of the existing digital signal processor is still used, the performance can be improved by means of the addition of the architecture of the address generator, Huffman decoder, and bit processing architecture. After all, to design and change the programmable processor is facilitated.

TABLE 1

| | Syntax | Description |
|---|---|---|
| LDPRE | ldpre GR0, AR0.x, R0M0A | GR0 ← MEM[AR0.x], GR1 ← MEM[inversion of AR0.x], GR2 ← R0M0[R0M0A], GR3 ← R0M1[R0M0A]. in the next cycle, address of AR0 is increased +2, R0M0A is increase +1. |
| LD4 | ld4 AR3.x+, R0M0A, AR4.y+, R0M1A | GR0 ← MEM[AR3.x]+, GR1 ← R0M0[R0M0A], GR2 ← MEM[AR4.y]+, GR3 ← R0M1[R0M0B]. |

Table 1 shows exclusive instructions and their functional features in detail. Herein, the instructions are proposed in order to run the MPEG-2/4 AAC algorithm efficiently. The proposed programmable processor is designed to support the exclusive instructions above.

TABLE 2

| High-speed IMDCT process | Operation cycle |
|---|---|
| Pre-processing | [N/2 * 2] + 3 |
| N/4 points IFFT | (2N/2) * log2N + 8 |
| Post-processing | [N/2 * 2] + 6 |
| Data inverse interleaving | [N/8 * 5] * 2 + 12 |

Table 2 shows the operation cycles which may appear when the IMDCT process is run by high-speed algorithm. Herein, the IMDCT process is a filter bank process of the MPEG-2/4 AAC algorithm. As is known in table 2 above, when 2048 points IMDCT is run by the proposed processor architecture, one audio channel needs totally 11,294 cycles according to the formula 4 below.

(pre-processing+$N/4$ point IFFT+post-processing+inverse interleaving) operation cycle =(2048+3)+(2048+6)+(5*2048/4+12)+(2048/4)*log(2048/4)+9

=[(13*2048/4)+(2048/4)*log(2048/4)+30]

=11,294 cycles    Formula 4

TABLE 3

| Processor | Run-time | Operation cycle | MIPS |
|---|---|---|---|
| Domestic audio only DSP | 1.3312 ms | 52.248 | n.a. |
| Taiwanese audio only VLSI | n.a. | 32.768 | n.a. |
| TMS320c62x | n.a. | n.a. | 7.5 |
| ADSP-21060 | 9 ms | n.a. | n.a. |
| The present invention | 150.88 us | 22.588 | 1.0588 |

Table 3 provides the run-time, operation cycles, and MIPS (Million Instructions per Second) when the IMDCT operation is run by the proposed method and hardware architecture, and by the existing programmable processors respectively. Herein, some items which are not disclosed are excluded. As a result of the performance analysis, because data can be transferred from the memory efficiently in accordance with the present invention, it is verified that, the amount of the operations needed is 14% of that of TI's TMS320c62x DSP core, and the operation cycles needed is approximately 42.4% of that of domestic audio only DSP core and 68.9% of that of Taiwanese ASIC chip respectively, in order to show the same performance. In addition, while ADSP-21060 core spends 9 ms to run the given operation, the present invention spends only 150.88 us, that is an excellent result.

As is mentioned above, it is economical in respect of the design price and very efficient in respect of the operation speed to implement the MPEG-2/4 AAC algorithm with the proposed instructions and hardware architecture, because, in the proposed instructions and hardware, the existing operation modules are reused and only data processing circuit and address generating flow control are added.

In this manner, the present invention can make up for the weak points in the existing programmable processors and run the MPEG-2/4 AAC algorithm efficiently.

What is claimed is:

1. Computing circuits for running an audio decoding algorithm on programmable processors comprising:

a program control device (110) for generating an operation start signal of the MPEG-2 or MPEG-4 AAC algorithm and controlling the programmable processor;

a program memory (150) for storing application programs of the programmable processor;

an inverse address (130) calculating unit for generating inverse addresses of the input data in MDCT or IMDCT operations of the MPEG-2 or MPEG-4 AAC algorithm;

a data memory (160,170) for storing operations data;

an address generator (120) for calculating the addresses of the data memory (160,170) by use of inverse addresses generated by the inverse address calculating unit (130);

a data ROM (180,190) for storing cosine and sine data;

a data processing device (140) for performing arithmetic and logic operations using the data memory (160,170) and the data ROM (180,190); and a state register for running the MPEG-2 or MPEG-4 decoding operations.

2. The computing circuits according to claim 1, wherein the data processing unit (140) comprises:

2 multiplication accumulators for accumulating a result of data multiplication;

1 ALU;

an input register for storing a value of data memory; and an accumulator for storing a result of operation and using the result in operation.

3. The computing circuits according to claim 1, wherein the inverse address calculating unit (130) comprises:

a control signal generator (201) for generating a control signal to which the number of points of MDCT or IMDCT operation stored in the state register of the program control device (110) is input;

14 inverters (202~215) which inversely transforms the lower 14 bits of the address register input according to the control signal; and 14 2-input multiplexers (216~229) which select a final address according to the control signal.

4. The computing circuits according to claim 3, wherein the control signal generator (201) comprises:

one 8-input AND gate (301) which generates 6 bits of LSB; and 7 2-input OR gates (302~308) for searching 1 bit of MSB to which the number of points of MDCT or IMDCT is input according to the start signal.

5. The computing circuits according to claim 3, wherein the control signal generator of the inverse address calculating unit comprises:

7 2-input OR gates for searching 1 bit of MSB to which the number of points of MDCT/IMDCT is input according to the start signal;

1 8-input OR gate for a quick generation of the 6 bits of LSB to support over 64 points MDCT/IMDCT; and a connection line for generating the control signal of the inverse address calculating unit.

6. The computing circuits according to claim 1, wherein the data processing device (140) comprises:

2 multiplicators (401,402) for processing small shift operations;

1 ALU (409);

an operator (410) which process the maximum, minimum, and absolute value;

a data bus switch (400);

16 input registers (411);

a data processing unit (407) for saturation/limit/round; and 4 accumulators (408).

* * * * *